(No Model.) 5 Sheets—Sheet 3.

J. CARSON & A. SHEDLOCK.
DIE STAMPING AND EMBOSSING MACHINE.

No. 575,633. Patented Jan. 19, 1897.

Witnesses
John Bader
Arthur C. Blay

Inventors
John Carson
Alfred Shedlock

By their Attorney
Alfred Shedlock

(No Model.) 5 Sheets—Sheet 4.

J. CARSON & A. SHEDLOCK.
DIE STAMPING AND EMBOSSING MACHINE.

No. 575,633. Patented Jan. 19, 1897.

(No Model.) 5 Sheets—Sheet 5.

J. CARSON & A. SHEDLOCK.
DIE STAMPING AND EMBOSSING MACHINE.

No. 575,633. Patented Jan. 19, 1897.

Witnesses
John Badr
Arthur C. Blaz

John Carson,
Alfred Shedlock,
Inventors.

By their Attorney
Alfred Shedlock.

UNITED STATES PATENT OFFICE.

JOHN CARSON, OF BROOKLYN, NEW YORK, AND ALFRED SHEDLOCK, OF JERSEY CITY, NEW JERSEY; SAID SHEDLOCK ASSIGNOR TO SAID CARSON.

DIE STAMPING AND EMBOSSING MACHINE.

SPECIFICATION forming part of Letters Patent No. 575,633, dated January 19, 1897.

Application filed July 13, 1894. Serial No. 517,482. (No model.)

*To all whom it may concern:*

Be it known that we, JOHN CARSON, residing at Brooklyn, county of Kings, State of New York, and ALFRED SHEDLOCK, residing at Jersey City, county of Hudson, State of New Jersey, citizens of the United States, have invented new and useful Improvements in Die Stamping and Embossing Machines, of which the following is a specification.

This invention covers an improvement in the art of die stamping and embossing and a machine embodying novel devices by which the same may be carried out.

Heretofore dies for stamping and embossing have been supplied with ink either by means of rollers or brushes and the die wiped to remove the ink from its flat surface by rubbing the die over a wiping pad or surface, generally of paper, leaving the ink in the intaglio to be transferred therefrom to the material to be stamped or printed. In some cases, where the intaglio-cutting is deep, a pad is used, applied by a dabbing or slipping action, to insure a proper distribution of the ink into the intaglio after it is supplied thereto by means of a brush, such pad then removing the excess of ink from said parts.

The part of this invention relating to inking the pad contemplates applying the ink to a pad and then pressing the inked pad against the die, and also in some cases to impart a slight amount of lateral or sliding motion to the pad or die when they are brought together. By using an inking-pad of this character a more uniform and regular supply of ink to the die may be made, and it admits of causing the ink to be applied to the die only where wanted, as the pad may be made to approximately conform to the configuration of the design on the die.

Another part of the invention relating to the improvement in the art is the removal of the surplus ink from the deeply-cut parts of a die by rolling in such parts an absorbent material, which is preferably in the form of a long strip stretched over projections of a flexible material attached to a cylindrical surface, which is caused to roll in unison with the surface of the die as the die is caused to move over this device. The absorbent material may advantageously be provided with a backing-strip, of impervious material, to prevent the ink getting onto the flexible projections which are arranged to enter the deep parts of the die.

An improvement in the wiping process consists in wiping the rear edge of the die, which is accomplished by causing the wiping pad or bed to move as the rear edge of the die is leaving the end of the bed, so that the ink will be wiped clearly from said edge of the die, the end of the bed being rounded and the bed moved in unison with the die, so that the edge of the die remains in contact with the wiping-paper on the bed, which extends over its said rounded edge, until the die has entirely cleared the bed; but to more clearly describe these improvements and the instrumentalities by which they are carried out reference will now be had to the accompanying drawings, in which—

The main frame of the machine comprises the bed or table $a$ and the two side pieces or half-arches $a'$ $a'$, connected together at their ends by the bar $a^2$. Fitted in boxes formed on the side pieces $a'$ $a'$ is the main shaft $b$, to the central part of which the cam $c$ is rigidly secured, and the gear-wheel $b'$ is secured to one end of this shaft. This wheel meshes into the pinion $b^2$ on the shaft $b^3$, which has its bearings in the side pieces $a'$ $a'$, the other end of this shaft being provided with a fly-wheel $b^4$, to which power may be applied by means of a belt, or a driving-pulley with or without a clutch device may be applied to the shaft $b^3$, if desired.

In adjustable vertical slide-bearings on the front of the side pieces $a'$ $a'$ is fitted the plunger $c'$, the upper end of which is provided with a roller $c^2$, against which the cam $c$ acts, and the lower end of the plunger carries the holder or chase $d$, in which is held the die $d'$ by means of spring-catches, hereinafter described. The die-counter is made up on the platen $a^3$, held by dowel-pins on a projection of the bed $a$.

The horizontally-sliding carriage $e$ is held in grooves in the frames $e'$ $e'$, which are located between the side pieces $a'$ $a'$ and bolted to the bed $a$ of the main frame. Motion is imparted to this carriage from the cam $e^2$, secured to the side of the gear-wheel $b'$ or on the shaft $b$, through the medium of the lever $e^3$, pivoted at $e^4$ to one of the side pieces $a'$, and the link or rod $e^5$, pivoted at one end to the adjustable stud $e^6$, carried on a bracket from the back part $e^7$ of the carriage $e$. The other end of the link $e^5$ is connected to the lower end of the lever $e^3$ by a forked or slotted bearing in the rod resting over a stud on the lever. The object of this construction is to allow of the link $e^5$ being detached from the lever $e^3$, so that the carriage $e$ and devices actuated thereby may, when desired, be inoperative, the free end of the link then being held up clear of the stud on the lower end of the lever by the hook $e^8$.

The spring $c^3$ supports the plunger $c'$ and holds the roller $c^2$ against the cam $c$, and the spring $e^9$ holds the roller at the upper end of the lever $e^3$ against the cam $e^2$ and moves the carriage $e$ back away from the plunger $c'$. These cams may be made positive in their actions, if desired, but it is thought preferable to retract the parts actuated by them by means of springs.

Figure 5:
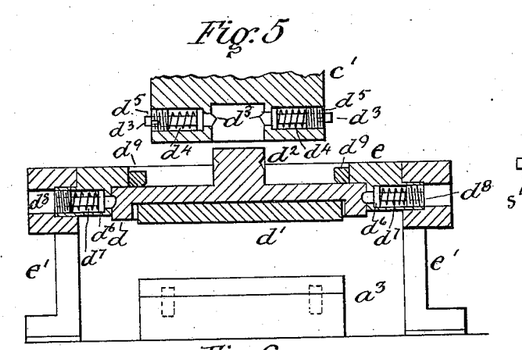
Fig. 5 is a transverse section on the line 5 5, Fig. 3, showing also a part of the plunger.
Figure 6:
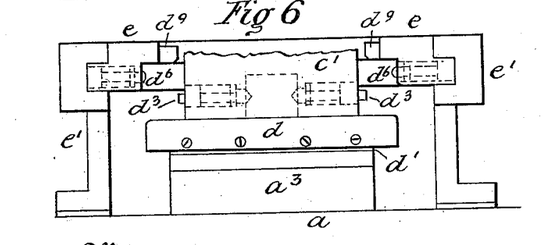
Fig. 6 is a front elevation of the same devices, showing the parts in different positions.
Figure 7:
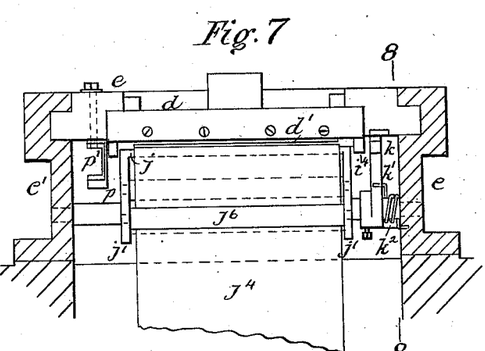
Fig. 7 is a section on the line 7 7, Fig. 1, showing a front view of the surplus-ink-removing device.

The die-holder $d$ is either held in the open front end of the carriage $e$, as shown at Fig. 5, in which the plunger $c'$ is shown in its highest position, clear of the die-holder, or it is held at the lower end of the plunger clear of the carriage $e$ when the plunger is depressed to make an impression, as shown at Fig. 6. The die-holder is provided with a neck $d^2$, adapted to enter the hole in the end of the plunger, and the plunger is provided with sliding catches $d^3$ $d^3$, fitted in lateral bores in the plunger, with their ends extending into the hole and into recesses formed in the neck $d^2$ of the die-holder, they being so held by the springs $d^4$ $d^4$, the strength of which is regulated by the screw-retaining plugs $d^5$ $d^5$. Similarly-constructed catches $d^6$ $d^6$, with their springs $d^7$ $d^7$ and adjusting-plugs $d^8$ $d^8$, are fitted in lateral bores formed in the carriage $e$, the ends of the catches entering recesses formed in the sides of the die-holder $d$. The ends of these sliding catches $d^3$ and $d^6$ are so formed and their actuating-springs $d^4$ and $d^7$ so adjusted that the functions performed by the catches are as follows, the upper bearing-faces of the catches $d^3$ $d^3$ being more acute in relation to the axes of the catches than their lower bearing-faces:

Commencing with the parts in the positions shown in Fig. 5, the carriage $e$ is holding the die-holder under the plunger, and as the plunger descends the catches $d^3$ $d^3$ are forced back by the end of the neck $d^2$ and snap into the recesses in the necks, the grip of the catches $d^6$ $d^6$ on the die-holder being such as to hold it up against this action. Now when the plunger is fairly seated on the die-holder it forces the holder down away from the carriage $e$, as shown at Fig. 6. The carriage remains stationary until the plunger again rises, and the upward grip of the catches $d^3$ $d^3$ on the die-holder is such that the catches $d^6$ $d^6$ give way when the upper edges of the sides of the die-holder come in contact with them and they slip into the recesses, the die-holder being prevented from any further upward motion by the flanges of the carriage, which extend over the top of the die-holder, so that the plunger leaves it in the carriage as the plunger continues its upward movement, as shown at Fig. 5. The carriage now moves away for the inking and wiping of the die, the plunger remaining up until the carriage returns. To insure that the die-holder will not be released from the grip of the plunger-catches before it is properly seated in the carriage, the ends of the catches $d^3$ $d^3$ extend from the plunger and pass along the side of the guide-stops $d^9$ $d^9$, and the catches are prevented from sliding out before the die-holder is properly seated in the carriage, and when it is the ends of the catches are clear of the stops $d^9$ $d^9$.

Figure 1:
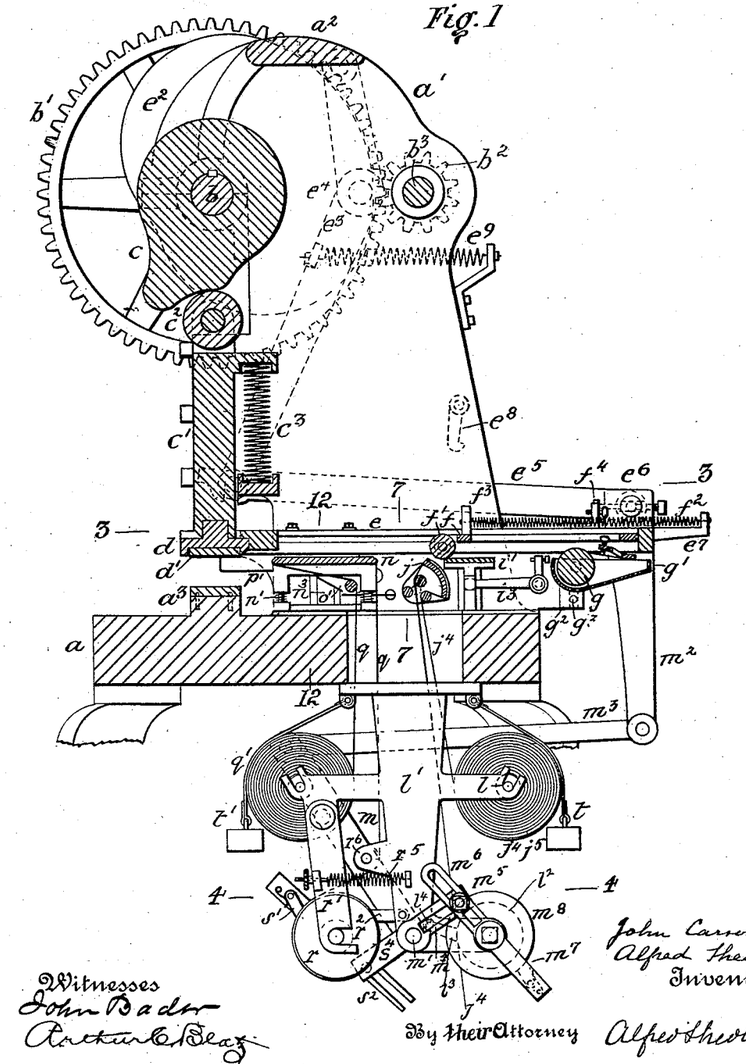
Figure 1 is an elevation, partly in section, of a die stamping and embossing machine embodying the improvements.
Figure 2:
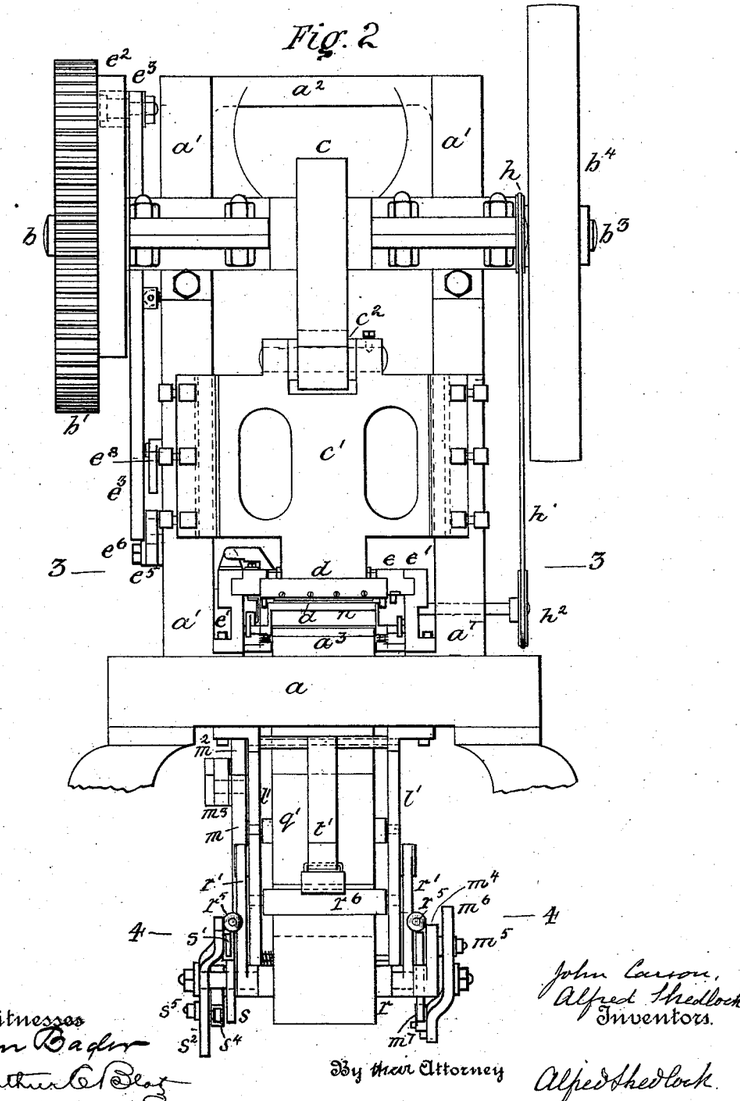
Fig. 2 is a front elevation of the same.
Figure 3:
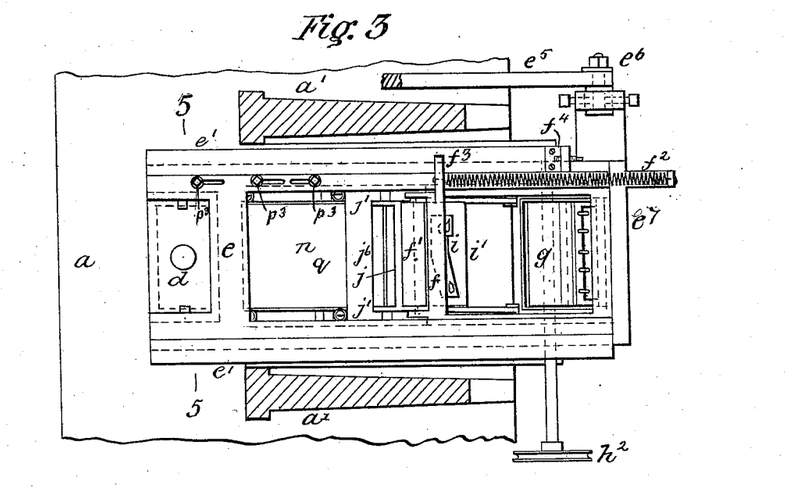
Fig. 3 is a plan view in section, taken on the line 3 3, Figs. 1 and 2.
Figure 4:
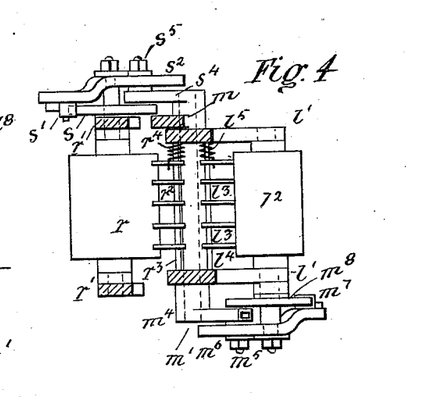
Fig. 4 is a view in section, taken on the line 4 4, Figs. 1 and 2.
Figure 10:
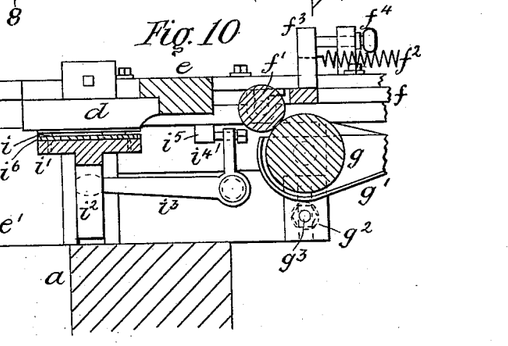
Fig. 10 is a sectional view of the inking-pad, taken on the line 10 10, Fig. 9, also showing in section the inking-roller and part of the ink-fountain.

The carriage $e$, behind the part that holds the die-holder $d$, is open and comprises the side bars, which slide in the grooves of the frames $e'$ $e'$, and the back piece $e^7$, which is fastened to the ends of these side bars. These side bars have grooves formed on their inner sides, in which the ink-roller frame $f$ works, said frame being provided with bearings, in which is journaled the ink-roller $f'$. This frame $f$ is normally held at the rear end of the carriage $e$ by the spring $f^2$, fastened to the projection $f^3$ of the frame $f$ and an arm on the back piece $e^7$ of the carriage $e$, and when the carriage is in its forward position, as shown in Figs. 1 and 3 of the drawings, the ink-roller $f'$ is over or has passed the forward edge of the inking-pad. As soon as the plunger $c'$ has moved up clear of the die-holder $d$ the carriage $e$ moves back, carrying with it the frame $f$, until the roller $f'$ comes in contact with the fountain-roller $g$, which is journaled in the ink-fountain $g'$, said frame being stopped positively and the pressure of the roller $f'$ on the roller $g$ regulated by the projection $f^3$, resting against the adjustable stop $f^4$, which is secured to one of the frames $e'$. The carriage $e$ continues its backward movement and expands the spring $f^2$, which holds the roller $f'$ against the roller $g$, said roller $g$ having rotary motion imparted to it from the main shaft $b$ by means of the pulleys $h$ on the shaft $b$, the belt or chain $h'$, and the pulley $h^2$ on the shaft of the roller $g$. The sizes of the rollers $f'$ and $g$ are so proportioned and the speed of the roller $g$ so fixed that the roller $f'$ makes at least a full revolution while it is in contact with roller $g$. The ink-fountain $g'$ is provided with side pieces $g^2$, which fit between the rear ends of the frames $e'e'$, and it is clamped in position by set-screws $g^3$, one side being shown in Figs. 1 and 10, slots being formed in the frames $e'e'$ to admit of the vertical adjustment of the ink-fountain. The fountain is provided with a scraper to determine the amount of ink taken up by the roller $g$.

Figure 9:
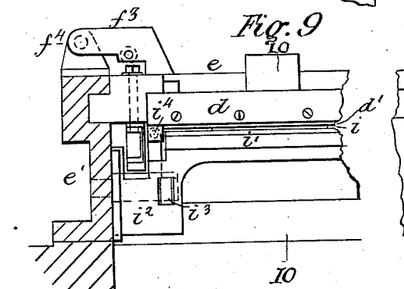
Fig. 9 is a front view of a part of the inking-pad.

The inking-pad $i$, made of any suitable material that will hold the ink, is carried by the table or plate $i'$, provided with legs $i^2 i^2$ at its ends, adapted to slide in vertical guides formed on the inner sides of the frames $e' e'$. The legs $i^2 i^2$ have slots in which fit the ends of the long arms of the bell-crank levers $i^3 i^3$. The short arms of the same are provided with adjusting-screws $i^4 i^4$, and the levers rock on studs projecting from the frames $e' e'$. Now when the carriage $e$ has just about completed its backward movement the die $d'$, carried by it, is over the inking-pad $i$, and the lugs $i^5 i^5$ on the carriage, coming in contact with the ends of the screws $i^4 i^4$, cause the pad to be lifted up against the die, (see Figs. 9 and 10,) the pressure between them being regulated by the adjustment of the screws $i^4 i^4$, and as the die is moving when the pad $i$ comes in contact with it a lateral movement or sliding action takes place which with some dies will be advantageous. The amount of this sliding action at the time contact is made between the die and pad will be governed by the relative lengths of the two arms of the bell-crank levers $i^3 i^3$. It may be reduced to a minimum or entirely omitted, as it is not an essential feature of this part of the invention.

Figure 8:
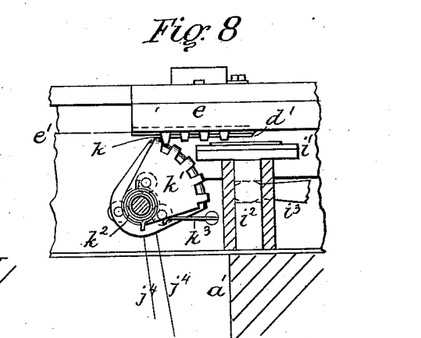
Fig. 8 is a sectional view of Fig. 7, taken on the line 8 8, also showing the inking-pad.
Figure 11:
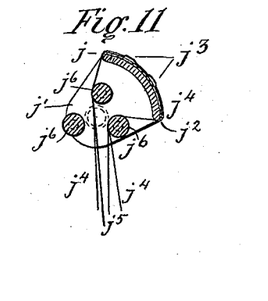
Fig. 11 is a view of the surplus-ink-removing device detached and in section.
Figure 12:
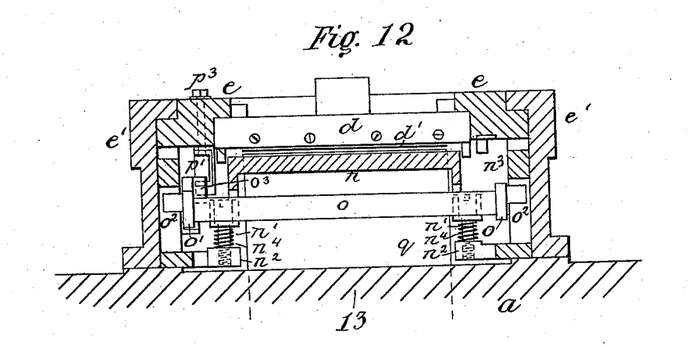
Fig. 12 is a sectional view of the wiping device, taken on the line 12 12, Figs. 1 and 14, and showing the die-holder in the position it occupies in Fig. 14.

It is thought preferable to so shape the pad $i$, as shown in Fig. 3, and by the use of underlaying-pieces, that it will approximately conform to the design on the die to place as little ink as possible on the flat surface and to perfectly ink the deep parts of the die, thus not only causing a saving of ink, but reducing to a minimum the amount of ink to be removed by the wiping process. It is also preferable to attach the flat inking-pad to a detachable plate, as shown at $i^6$, Figs. 9 and 10, which is held in position on the table $i'$ by dowel-pins. When the carriage $e$ commences its forward movement the pad falls away from the die, and the die passes over the surplus-ink-removing device, which consists of a rocking frame composed of a cylindrical top $j$ with side pieces $j' j'$, provided with short shafts fitted to rotate in the side frames $e' e'$, a detachable plate $j^2$, provided with dowel-pins, by which it is held on the cylindrical top $j$, the underlay $j^3$, composed of a suitable flexible material attached to the plate $j^2$ as protuberances, as shown at Fig. 11, shaped and arranged to enter the deeply-cut parts of the die, which are liable to receive an excess of ink, an absorbent covering $j^4$ in the form of a continuous strip, and a backing $j^5$ of an impervous material, as a suitable paper, also in a continuous strip to protect the underlay $j^3$ from the ink taken up by the covering $j^4$, and guide-rollers $j^6 j^6$, journaled in the side pieces $j' j'$, as shown at Fig. 11, over which the covering $j^4$ and its backing $j^5$ are guided to and from the device by which they are controlled. The flexible parts of this surplus-ink-removing device which enter the deeply-cut parts of the die not only remove the excess of ink placed therein by the inking-pad, but insure the proper distribution of the ink to all parts of the intaglio. The surface of this ink-removing device is caused to roll and to be moved with the surface of the die by means of the rack $k$, secured on the under side of the carriage $e$, and the segmental gear-wheel $k'$, secured to one of the shafts of the side pieces $j'$. The front tooth of the rack is shown longer than the other teeth, and it catches into the front tooth of the gear when the front edge of the die comes over the front edge of the cylindrical top $j$, as shown at Fig. 8, and so causes the projecting parts of the covering $j^4$ to enter the deep parts of the die as the die continues its motion. When the die has passed over this device, the device is thrown back by means of the spring $k^2$ until it is stopped by the spring $k^3$, which is stronger than the spring $k^2$, and the gear-wheel $k'$ is, between the actions of these springs, held in the position shown in Fig. 8. The object of the spring $k^3$ is to allow the gear $k'$ to give way under the front tooth of the rack $k$ when the die is moving backward for a fresh supply of ink, and the object of making the other teeth of the rack so that they will clear the front tooth of the wheel $k'$ when the wheel is in its normal position is to avoid repeated disturbances of the wheel and attached parts. The covering of this device is supplied from the roll $j^4 j^5$, whose axis $l$ rotates in open bearings in the frames $l' l'$, secured to the under side of the bed $a$, and after passing around the rollers $j^6 j^6$ and over the cylindrical surface it passes between the feeding-roller $l^2$, the presser, and retention-pawls $l^3$ $l^3$, which are secured to the shaft $l^4$ and are pressed toward the roller $l^2$ by the spring $l^5$. The roller $l^2$ may be provided with fine teeth or roughened to insure a perfect grip on the covering $j^4 j^5$, and it is partly rotated each action of the machine by the following means: The lever $m$, which is secured to the rock-shaft $m'$, is, by the link $m^3$, connected to the arm $m^2$, projecting downwardly from the end piece $e^7$ of the carriage. The slotted arm $m^4$, connected to the shaft $m'$, imparts, by means of the stud $m^5$, which may be set at any distance from the center of the shaft $m'$, motion to the slotted arm $m^6$, fitted to work on the shaft of the roller $l^2$, said arm being provided with a spring-pawl $m^7$, which acts against the ratchet-disk $m^8$, secured to the shaft of the roller $l^2$. The length of the covering $j^4 j^5$ fed to the surplus-ink-removing device may by this device be adjusted as desired. In some cases it may not be necessary to use this ink-removing device. It may then be made inoperative by removing the covering and the underlay or by setting the wheel $k'$ on its shaft out of the path of the rack $k$. The next and last device the die passes over before it is brought over the impression-bed is the wiping-table. This table $n$ has four legs, in which are seated the heads of the screws $n'$ $n'$, the ends of said screws being fitted in the horns $n^2$ $n^2$, projecting from the slides $n^3$ $n^3$, fitted in vertical grooves in the side frames $e'$ $e'$. Springs $n^4$ $n^4$ surround the screws $n'$ $n'$ and hold the table $n$ up, its upper surface being adjusted for the right pressure on the die by the manipulation of the screws $n'$ $n'$. Beneath the table $n$ and journaled in the side frames $e'$ $e'$ is the shaft $o$, near the ends of which are secured the arms $o'$ $o'$, which are provided with rollers or studs $o^2$ $o^2$, extending in slots or openings in the slides $n^3$ $n^3$, and at one end is another arm provided with a roller $o^3$, which is normally held in the position shown at Fig. 14 by the flat spring $o^4$, which acts on the arm $o'$, so as to bring the roller $o^3$ into this normal position from either side of it. It may be moved, and this position is such that the roller $o^3$ passes under the ledge $p$ $p'$ during the forward movement of the carriage and over it during the backward movement of the carriage. This ledge is composed of two parts. The outer part $p$, which has a short acting-surface, is clamped to the carriage $e$ by the bolt $p^2$, and the other part, which is much longer, is clamped to the carriage by the bolts $p^3$ $p^3$, which also assist in holding the part $p$ in place, all of said bolts passing through slots in the carriage to admit of the proper adjustment of the ledges to suit different sizes of dies.

Figure 13:
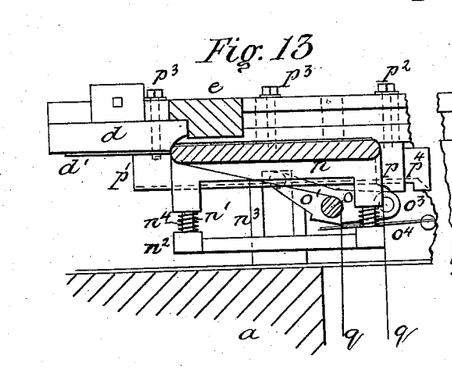
Fig. 13 is a section of the wiping device, taken on line 13, Fig. 12, showing the die as about to leave the wiping-bed.
Figure 14:
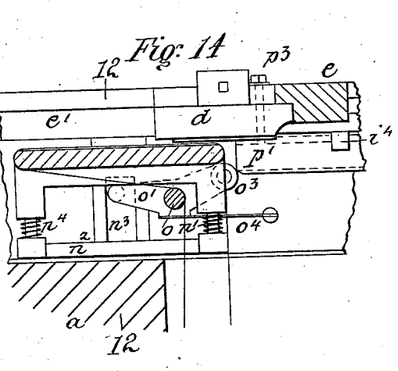
Fig. 14 is a similar section showing the die over the bed ready to be wiped.
Figure 15:
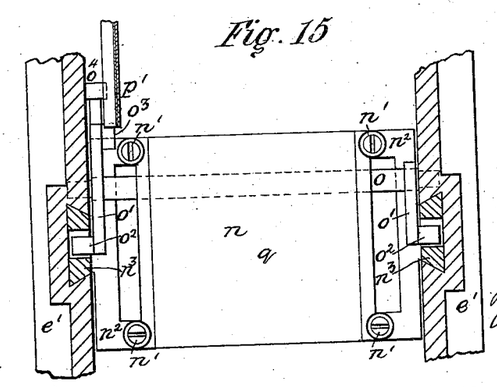
Fig. 15 is a plan of the wiping device, showing the frames of the machine and parts of the device in section.

A continuous strip of paper $q$ passes up through a hole in the bed $a$, over the shaft $o$, which may be provided with a loose roller-sleeve, around over the top of the table $n$, and down through said hole in the table to the winding-up or feeding mechanism. Now when the die $d'$ has arrived over the part of the wiping-table that it is desired it shall commence to be wiped, the front edge of the ledge $p'$ acts on the roller $o^3$, as shown in Fig. 14, and depresses it. This action causes the table $n$ to be raised by the studs $o^2$ $o^2$, bearing against the upper sides of the openings in the slides $n^3 n^3$, and the paper covering of the table held in contact with the die as the die passes along; but when the rear edge of the die approaches the rounded front edge of the table $n$ the roller $o^3$ is struck by the ledge $p$, the leading edge of which is so shaped as to further raise the table and keep the rounded edge of the table or the covering thereon in contact with the rear edge of the die until the die is entirely clear of the table, as shown at Fig. 13, thus removing all of the ink from the die and entirely avoiding the blur caused by the ink, which often runs over the back edge of the die in the wiping processes now practiced. After the impression has been made and the carriage moves back with the die the rear edge of $p^4$ of the ledge $p'$ catches under the roller $o^3$, said roller in the meantime having been brought into its normal position after the ledges have entirely cleared it during the forward movement of the carriage, and causes the roller to be raised and pass over the ledge or the ledge to pass under the roller, and so insures the table being moved out of the path of the die during its backward travel by the studs $o^2$ $o^2$ acting on the lower ends of the openings in the slide $n^3$ $n^3$. The strip of paper for the wiping-pad passes from the roll $q'$ (whose shaft rests in open bearings on the frames $l'$ $l'$) and passing under the guide-roller $r^6$ is wound up on the drum $r$, whose shaft rests in open bearings formed at the ends of the hanging arms $r'$ $r'$. A set of presser and retention pawls $r^2$ $r^2$, secured to the shaft $r^3$, are held down by the spring $r^4$, and the drum $r$ or paper wound thereon is pressed against these pawls by the springs $r^5$ $r^5$, so that as the size of the roll of paper on the drum increases the axis of the drum gradually recedes from the pawls $r^2$ $r^2$ and from the shaft $m'$. The mechanism now to be described imparts intermittent rotary motion to the drum, but it might here be remarked before describing the mechanism that the pawls $r^2$ $r^2$ are set above the line of travel of the axis of the drum $r$, thereby tending to cause said drum to rotate in the direction it moves in winding up the paper $q$, due to springs $r^5$ $r^5$ pressing the drum toward the pawls, and so causing the paper to be kept taut.

On the shaft of the drum $r$ is secured the ratchet or feeding disk $s$, against which act the pawls $s'$, carried by the slotted arm $s^2$, which is fitted to rock on the shaft of the drum. Secured to the shaft $m'$, or forming a part of the lever $m$, is an arm $s^4$, provided with a slot or groove in which is carried the stud $s^5$, adapted to be set in any position therein and constructed similarly to the arm $m^4$ and stud $m^5$. The stud $s^5$ works in the slot of the arm $s^2$, and when the stud is set in the desired position it of course moves through the path of uniform travel, but acts in different parts of the arm $s^2$, and continually at a greater distance from the axis of the drum as the drum moves away from the shaft $m'$, by reason of the paper that is wound thereon increasing in diameter, so that the angular motion of the drum is gradually decreased and in about the proportion of the increase of the size of the roll of paper, thus practically insuring a uniform feed of the paper over the table $n$ after the stud $s^5$ is set to feed the desired length of paper for each action of the machine.

When the paper is to be removed from the drum, the drum is taken out of its bearings in the hanging arms $r'$ $r'$, they being drawn back or released from the springs $r^5$ $r^5$ for this purpose.

The straps and weights $t$ $t'$ are for the purpose of preventing the rolls $j^4$, $j^5$, and $q'$ from racing.

The novel features of the inking device—viz., a pad adapted to conform to the configuration and deep parts of the design of the die—may be applied to a curvilinear surface caused to roll with the die as the die passes over it. Mechanism similar to that employed in the surplus-ink-removing device may be used for the purpose. The surplus-ink-removing device may be applied to a flat surface. A vertically-reciprocating frame similar to that shown in the inking device may be used for this purpose.

For some kinds of work ink may be applied to the die direct from a roller, in which case the pad inking device may be removed and the ink applied direct from the inking-roller or the fountain brought forward, so that the die will pass over and in contact with its roller.

We claim as our invention—

1. In a die stamping and embossing machine, the combination of a vertically-reciprocating plunger, a horizontally-reciprocating carriage, a die-holder adapted to be attached to the plunger and the carriage and removed from either one by the other, spring-actuated catches on the plunger for securing the die-holder thereto, and similar spring-actuated catches on the carriage.

2. In a die stamping and embossing machine, the combination of a vertically-reciprocating plunger, a horizontally-reciprocating carriage, a die-holder adapted to be attached to the plunger and the carriage and removed from either one by the other, spring-actuated catches on the plunger having their upper bearing-faces more acute than their lower bearing-faces for securing the die-holder thereto, similar spring-actuated catches on the carriage, the plunger spring-actuated catches having sufficient holding power on the die-holder to cause the carriage spring-actuated catches to engage with and hold the die-holder as the plunger ascends, and the carriage-catches having sufficient power to cause the plunger-catches to engage with and hold the die-holder as the plunger descends.

3. In a die stamping and embossing machine, the combination of a vertically-reciprocating plunger, a horizontally-reciprocating carriage, a die-holder adapted to be attached to the plunger and the carriage and removed from either one by the other, spring-actuated catches on the plunger for securing the die-holder thereto, similar spring-actuated catches on the carriage, and guide-stops on the carriage for locking the plunger-catches during the time the carriage catches are engaging with the die-holder.

4. In a die stamping and embossing machine, the combination of a vertically-reciprocating plunger, a horizontally-reciprocating carriage, a die-holder adapted to be attached to the plunger, and the carriage, and removed from either one by the other, spring-actuated catches on the plunger for securing the die-holder thereto, similar spring-actuated catches on the carriage, and cams on the main shaft of the machine for actuating the plunger and the carriage in such manner that the carriage is held stationary while the die-holder is being attached to it or detached from it.

5. In a die stamping and embossing machine, the combination of a vertically-reciprocating plunger, a horizontally-reciprocating carriage, a die-holder adapted to be attached to the plunger and the carriage and removed from either one by the other, spring-actuated catches on the plunger for securing the die-holder thereto, similar spring-actuated catches on the carriage, and flanges or ledges on the carriage acting as a positive stop to the upward movement of the die-holder when the plunger is being released thereof.

6. In a die stamping and embossing machine, the combination of a die, an ink-receiving surface or pad, an inking-roller for applying ink to the pad, and means for bringing the die and pad together by a combined flatwise and sliding movement, whereby ink is uniformly imparted to the die from the pad.

7. In a die stamping and embossing machine, the combination of a die, an ink-receiving surface or pad, having its contour approximating that of the design of the die, adapted to make contact with the die, means for bringing the pad against the die with a combined flatwise and lateral movement, and an inking-roller for applying ink to the ink-receiving surface or pad.

8. In a die stamping and embossing machine, the combination of a die, an ink-receiving surface or pad, adapted to make contact with the die, an inking-roller for applying ink to the ink-receiving surface or pad, a carriage to which the die, by its holder, is attached and by which the die is brought over the inking-pad, a sliding frame moving at right angles to the travel of the carriage and to which the pad is attached and means for causing the pad to come in contact with the die while the carriage is completing its movement to bring the die over the pad whereby the ink on the pad is applied to the die by a combined flatwise and lateral movement.

9. In a die stamping and embossing machine, the combination of a die, an ink-receiving surface or pad, adapted to make contact with the die, an inking-roller for applying ink to the ink-receiving surface or pad, a carriage to which the die by its holder is attached actuated to carry the die over the pad, a sliding frame moving at right angles to the travel of the carriage and to which the pad is attached, a lug on the carriage, a bell-crank lever joined by one of its arms to the sliding frame and actuated to raise said frame and the pad by the lug on the carriage coming in contact with its other arm when the die is just about over the pad, thereby bringing the pad in contact with the die while the die is moving.

10. In a die stamping and embossing machine, the combination of a die, an ink-receiving surface or pad, adapted to make contact with the die, an inking-roller for applying ink to the ink-receiving surface or pad, a carriage to which the die, by its holder is attached, and by which the die is brought over the inking-pad, a sliding frame to which the pad is attached, means for causing the pad to come in contact with the die, a frame fitted to slide in the carriage and to which the ink-roller is journaled, a spring for holding the frame at the end of the carriage, an ink-fountain roller against which the inking-roller makes contact and a stop for determining the position of the inking-roller in relation to the fountain-roller.

11. In a die stamping and embossing machine, the combination of a die, an ink-receiving surface or pad, adapted to make contact with the die, an inking-roller for applying ink to the ink-receiving surface or pad, a carriage to which the die, by its holder, is attached, and by which the die is brought over the inking-pad, a sliding frame to which the pad is attached, means for causing the pad to come in contact with the die, a frame fitted to slide in the carriage and to which the ink-roller is journaled, a spring for holding the frame at the end of the carriage, an ink-fountain roller against which the inking-roller makes contact and a stop for determining the position of the inking-roller in relation to the fountain-roller, and an adjustable ink-fountain carrying the fountain-roller.

12. In a die stamping and embossing machine, the combination of a die, a surplus-ink-removing device constructed so that its active surface will press into the deep parts of the design, an underlay with raised portions of flexible material corresponding to the deep parts of the die, an absorbent covering on the surplus-ink-removing device, and means for moving the absorbent covering.

13. In a die stamping and embossing machine, the combination of a die, an inking device, a surplus-ink-removing device constructed so that its active surface will press into the deep parts of the design and act solely on the ink therein, an absorbent covering on the surplus-ink-removing device, an impervious backing for the absorbent covering, and means for moving the absorbent covering and the impervious backing.

14. In a die stamping and embossing machine, the combination of a die, a surplus-ink-removing device constructed so that its active surface will press into the deep parts of the design, an underlay with raised portions of flexible material corresponding to the deep parts of the die, an absorbent covering on the surplus-ink-removing device, an impervious backing for the absorbent covering, and means for moving the absorbent covering and the impervious backing.

15. In a die stamping and embossing machine, the combination of a reciprocating carriage, a die attached thereto by its holder, a surplus-ink-removing device having a cylindrical form and journaled in the frame of the machine, a rack on the reciprocating carriage, a segmental gear-wheel on the axle of the ink-removing device and with which the rack meshes during the forward movement of the carriage, and a recoil-spring connected to the ink-removing device.

16. In a die stamping and embossing machine, the combination of a reciprocating carriage, a die attached thereto by its holder, a surplus-ink-removing device having a cylindrical form and journaled in the frame of the machine, a rack on the reciprocating carriage, a segmental gear-wheel on the axle of the ink-removing device with which the rack meshes during the forward movement of the carriage, a recoil-spring connected to the ink-removing device, and a buffer-spring for holding the ink-removing device in position for the rack to engage with the wheel.

17. In a die stamping and embossing machine, the combination of a reciprocating carriage, a die attached thereto by its holder, a surplus-ink-removing device having a cylindrical form and journaled in the frame of the machine, a rack on the reciprocating carriage, a segmental gear-wheel on the axle of the ink-removing device and with which the rack meshes during the forward movement of the carriage, a recoil-spring connected to the ink-removing device, an absorbent covering, means for moving the same, and guide-rollers for the covering in the ink-removing device.

18. In a die stamping and embossing machine, the combination of a reciprocating carriage, a die attached thereto by its holder, a surplus-ink-removing device having a cylindrical form and journaled in the frame of the machine, a rack on the reciprocating carriage, a segmental gear-wheel on the axle of the ink-removing device and with which the rack meshes during the forward movement of the carriage, a recoil-spring connected to the ink-removing device, guide-rollers in the ink-removing device, an absorbent covering, a feeding-roller for drawing the covering over the ink-removing device, retention-pawls between which and the feeding-roller the covering is clamped and means for intermittently rotating the feeding-roller.

19. In a die stamping and embossing machine, the combination of a reciprocating carriage, a die attached thereto by its holder, a surplus-ink-removing device having a cylindrical form and journaled in the frame of the machine, a rack on the reciprocating carriage, a segmental gear-wheel on the axle of the ink-removing device and with which the rack meshes during the forward movement of the carriage, a recoil-spring connected to the ink-removing device, guide-rollers in the ink-removing device, an absorbent covering, a feeding-roller for drawing the covering over the ink-removing device, retention-pawls between which and the feeding-roller the covering is clamped, a ratchet-wheel on the feed-roller shaft and an arm provided with a pawl rocking on the shaft, a lever connected by a link to the reciprocating carriage, a slotted arm connected to or forming part of this lever and an adjustable pin joining this arm to the pawl-arm.

20. In a die stamping and embossing machine, a reciprocating carriage, a die carried thereby, a wiping device consisting of a bed with rounded edges and a movable covering adapted to be moved against the die as it partly or wholly comes over the bed, means for so raising the bed and thus causing the surplus ink to be wiped off the surface of the die, and means for further raising the bed to cause the covering on the rounded edge of the bed to move over the rear edge of the die, and partly up the rear side thereby thoroughly cleaning the die.

21. In a die stamping and embossing machine, the combination of a reciprocating carriage, a die carried thereby, slides fitted in the frame of the machine so as to move at right angles to the travel of the carriage, a wiping-bed attached to these slides, levers or arms connected to a common shaft and provided with studs extending into slots in the slides, an arm also connected to the shaft and having a roller at its end, a ledge adjustably attached to the carriage and located so that one of its sides will act on the roller on the arm when the die is over or partly over the wiping-bed during its forward motion.

22. In a die stamping and embossing machine, the combination of a reciprocating carriage, a die carried thereby, slides fitted in the frame of the machine so as to move at right angles to the travel of the carriage, a wiping-bed attached to these slides, levers or arms connected to a common shaft and provided with studs extending into slots in the slides, an arm also connected to the shaft and having a roller at its end, a ledge adjustably attached to the carriage and located so that one of its sides will act on the roller on the arm when the die is over or partly over the wiping-bed during its forward motion, and so as to engage with the roller at its other side when the die is moving backwardly, and a spring acting on the arm to hold the roller in position to be caught by the ledge as it moves in the two directions.

23. In a die stamping and embossing machine, the combination of a reciprocating carriage, a die carried thereby, slides fitted in the frame of the machine so as to move at right angles to the travel of the carriage, a wiping-bed attached to these slides, levers or arms connected to a common shaft and provided with studs extending into slots in the slides, an arm also connected to the shaft and having a roller at its end, a ledge adjustably attached to the carriage and located so that one of its sides will act on the roller on the arm when the die is over or partly over the wiping-bed during its forward motion, and so as to engage with the roller at its other side when the die is moving backwardly, a spring acting on the arm to hold the roller in position to be caught by the ledge as it moves in the two directions, and another adjustable ledge arranged and formed to act on the roller when the rear edge of the die is about to leave the wiping-pad and so raise the pad as to cause its rounded end to sweep over the rear edge of the die.

24. In a die stamping and embossing machine, the combination of a reciprocating carriage, a die carried thereby, slides fitted in the frame of the machine so as to move at right angles to the travel of the carriage, a wiping-bed attached to these slides by means of adjustable guide-rods, springs between the slides and the bed, levers or arms connected to a common shaft and provided with studs extending into slots in the slides, an arm also connected to the shaft and having a roller at its end, a ledge adjustably attached to the carriage and located so that one of its sides will act on the roller on the arm when the die is over or partly over the wiping-bed during its forward motion.

25. The combination of a winding-up roller, a retention pawl or pawls, against which the roller or paper thereon bears, spring-actuated bearings carrying the roller, and means for intermittently rotating the roller.

26. The combination of a winding-up roller, a retention pawl or pawls, against which the roller or paper thereon bears, spring-actuated bearings carrying the roller, means for intermittently rotating the roller, the direction of pressure of the pawl or pawls being on one side of the line of travel of the axis of the roller.

27. The combination of a winding-up roller, a retention pawl or pawls, against which the roller or paper thereon bears, spring-actuated bearings carrying the roller, a slotted arm fitted to work on the axle of the roller, a feeding-pawl carried thereby, a disk or wheel on which the feeding-pawl acts, and a stud or pin adapted and set to be moved through a uniform distance and to act in different parts of the slot in the arm as the roller moves away from the stud or pin.

28. The combination of a winding-up roller, a retention pawl or pawls, against which the roller or paper thereon bears, spring-actuated bearings carrying the roller, a slotted arm fitted to work on the axle of the roller, a feeding-pawl carried thereby, a disk or wheel on which the feeding-pawl acts, and a stud or pin adapted and set to be moved through a uniform distance and to act in different parts of the slot in the arm as the roller moves away from the stud or pin, the wiping-bed of a die stamping-machine, and the wiping-paper moved over the bed by the winding-up roller.

29. In a die stamping and embossing machine, a reciprocating carriage, a die carried thereby, a wiping device consisting of a bed with rounded edges and a movable covering adapted to be moved against the die as it partly or wholly comes over the bed, means for so raising the bed and thus causing the surplus ink to be wiped off the surface of the die, means for further raising the bed to cause the covering on the rounded edge of the bed to move over the rear edge of the die, and partly up the rear side, thereby thoroughly cleaning the die, a winding-up roller for controlling the movable covering of the bed, a rocking arm, feeding connection between this arm and the winding-up roller attached thereto, a lever connected or forming part of this arm, and a link connecting the lever to the reciprocating carriage.

30. In a die stamping and embossing machine, the combination of a vertically-reciprocating plunger, a horizontally-reciprocating carriage, a die-holder alternately carried by the plunger and the carriage, an inking device, a rolling surplus-ink-removing device constructed so that its active surface will press into the deep part of the design and act solely on the ink therein, and a wiping device.

31. In a die stamping and embossing machine, the combination of a vertically-reciprocating plunger, a horizontally-reciprocating carriage, a die-holder alternately carried by the plunger and the carriage, an inking-pad, an ink-fountain, a roller for carrying ink from the fountain to the pad, means for moving the pad vertically, a rolling surplus-ink-removing device, an absorbent covering therefor, a wiping-bed and removable wiping-surface therefor, and means for moving the wiping-bed vertically.

In testimony that we claim the foregoing as our invention we have signed our names, in presence of two witnesses, this 20th day of June, 1894.

JOHN CARSON.
ALFRED SHEDLOCK.

Witnesses:
WILLIAM MOFFAT,
KATIE McNAMARA.